Patented June 26, 1923.

1,460,039

UNITED STATES PATENT OFFICE.

CARL AXEL ROBERT SAMSIOE, OF STOCKHOLM, SWEDEN.

CLEANING PASTE.

No Drawing. Application filed February 5, 1920. Serial No. 356,369.

*To all whom it may concern:*

Be it known that I, CARL AXEL ROBERT SAMSIOE, a subject of the King of Sweden, residing at 2 Artillerigatan, Stockholm, Sweden, have invented new and useful Improvements in Cleaning Pastes, of which the following is a specification.

The object of this invention is a paste for cleaning of articles of metal, bone, horn, enamel and the like, which paste is easily soluble in water and for that reason can be easily removed after the cleaning of the article.

This paste consists of a mixture of bicarbonate of soda and a quantity of glycerine, sufficient for obtaining the necessary consistency of the said mixture.

If desired colouring, smelling, tasting or other means may be added to the mixture without thereby changing its essential composition, provided that glycerine and bicarbonate of soda are maintained as main components.

Having now particularly described the nature of my invention and the manner of its operation, what I claim is:

An approved cleaning paste consisting essentially of a mixture of bicarbonate of soda and glycerine.

In testimony whereof I have signed my name to this specification.

CARL AXEL ROBERT SAMSIOE.